(12) United States Patent
Li et al.

(10) Patent No.: US 11,956,307 B1
(45) Date of Patent: Apr. 9, 2024

(54) DISTRIBUTED TASK OFFLOADING AND COMPUTING RESOURCES MANAGEMENT METHOD BASED ON ENERGY HARVESTING

(71) Applicant: CHONGQING UNIVERSITY OF POSTS AND TELECOMMUNICATIONS, Chongqing (CN)

(72) Inventors: Yun Li, Chongqing (CN); Zhixiu Yao, Chongqing (CN); Shichao Xia, Chongqing (CN); Guangfu Wu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 17/909,374

(22) PCT Filed: Nov. 4, 2021

(86) PCT No.: PCT/CN2021/128685
§ 371 (c)(1),
(2) Date: Sep. 3, 2022

(87) PCT Pub. No.: WO2022/199036
PCT Pub. Date: Sep. 29, 2022

(30) Foreign Application Priority Data

Mar. 24, 2021 (CN) .......................... 202110312344.6

(51) Int. Cl.
*H04L 67/1023* (2022.01)
(52) U.S. Cl.
CPC ................................ *H04L 67/1023* (2013.01)

(58) Field of Classification Search
CPC .................................................. H04L 67/1023
See application file for complete search history.

(56) References Cited

U.S. PATENT DOCUMENTS

| | | | | |
|---|---|---|---|---|
| 11,200,989 | B1 * | 12/2021 | Sundararajan | .......... H04L 67/10 |
| 2017/0164237 | A1 * | 6/2017 | Mahmoodi | ....... H04W 52/0251 |

(Continued)

FOREIGN PATENT DOCUMENTS

| | | |
|---|---|---|
| CN | 108319502 A | 7/2018 |
| CN | 111163521 A | 5/2020 |
| CN | 113114733 A | 7/2021 |

OTHER PUBLICATIONS

International Search Report for PCT/CN2021/128685 dated Jan. 24, 2022, ISA/CN.

(Continued)

*Primary Examiner* — Minh Chau Nguyen
(74) *Attorney, Agent, or Firm* — Yue (Robert) Xu; Apex Attorneys at Law, LLP

(57) ABSTRACT

A distributed task offloading and computing resources management method based on energy harvesting is provided, including: establishing a task local computing model and an edge cloud computing model; establishing a device maximum benefit objective function based on the perturbation Lyapunov optimization algorithm and a mobile edge computing server maximum benefit objective function; pre-selecting, by the device based on a pre-screening criteria, a mobile edge computing server for task offloading; calculating an optimal task size strategy for performing task offloading by the device to the selected mobile edge computing server by using a Lagrange multiplier algorithm and a KKT condition; obtaining an optimal quotation strategy of the mobile edge computing server for the device in each of time slots; and obtaining a solution of the optimal task size strategy meeting a Stackelberg equilibrium and a solution of (Continued)

the optimal dynamic quotation strategy meeting the Stackelberg equilibrium as a resource allocation strategy.

9 Claims, 3 Drawing Sheets

(56) References Cited

U.S. PATENT DOCUMENTS

2021/0219266 A1* 7/2021 Ibrahim ................ H04W 12/06
2021/0357255 A1* 11/2021 Mahadik ............. G06F 11/3006

OTHER PUBLICATIONS

Xia, Shicha, A Distributed Stochastic Task Offloading Methodology for IoT on e-Health, ICC 2020—2020 IEEE International Conference on Communications (ICC), Jun. 11, 2020.

Yao, Xiuzhi, Research on Resource Allocation in Mobile Edge Computing Based on Game Theory, Feb. 15, 2021.

* cited by examiner

DISTRIBUTED TASK OFFLOADING AND COMPUTING RESOURCES MANAGEMENT METHOD BASED ON ENERGY HARVESTING

The present application is the national phase of International Patent Application No. PCT/CN2021/128685, titled "DISTRIBUTED TASK OFFLOADING AND COMPUTING RESOURCES MANAGEMENT METHOD BASED ON ENERGY HARVESTING", filed on Nov. 4, 2021, which claims the priority to Chinese Patent Application No. 202110312344.6 titled "DISTRIBUTED TASK OFFLOADING AND COMPUTING RESOURCES MANAGEMENT METHOD BASED ON ENERGY HARVESTING", filed on Mar. 24, 2021 with the China National Intellectual Property Administration (CNIPA), both of which are incorporated herein by reference in their entireties.

FIELD

The present disclosure relates to the technical field of mobile communication, and in particular to a distributed task offloading and computing resources management method based on energy harvesting.

BACKGROUND

With the rapid development of Internet of Things and the popularity of intelligent terminal devices, cloud-oriented applications (such as virtual reality, autonomous driving and online games) having features of computational intensity and latency sensitivity are developing at an unprecedented speed in recent years. Although the processing performance of CPUs and the storage capacity of mobile devices (MDs) are continuously improved, computing performance and battery life are facing severe challenges in the era of big data and artificial intelligence. According to the mobile edge computing (MEC), as a new computing mode, all or part of local computing tasks are offloaded to the MEC server, significantly improving the service experience of the users. In an MEC system, computing and storage resources are deployed at an edge network, effectively reducing delay and avoiding data communication congestion.

Limited by the size and cost of hardware, the conventional battery has a limited capacity and cannot meet the requirements for long-term battery life of a device. In some scenarios, it is impossible or extremely expensive to adopt a rechargeable battery or a conventional grid power. Therefore, it is required to adopt a cheaper, more convenient and more reliable power supply mode. With the energy harvesting (EH) technology which has become an important technology for green communication and long-lasting operation, renewable energy such as solar energy and wind energy can be captured for data communication and task processing by the MD. It is of great significance to integrate the EH technology into the MEC system.

With the fusion of EH and MEC, stability of computing performance of a system is facing a new challenge. The following results have been achieved: (1) a dynamic computing offloading algorithm based on energy harvesting in mobile edge computing, in which a low-complexity and centralized task offloading algorithm based on perturbation Lyapunov optimization algorithm is provided in a point-to-point communication scenario of a single MD and a single MEC server; (2) a task offloading energy consumption and delay compromise algorithm based on energy harvesting in the mobile edge computing, in which a dynamic task offloading strategy is provided to balance energy consumption and computational delay of a MEC system based on EH. The energy consumption and computational delay are transformed to an average weighted sum problem of energy consumption and execution delay of the mobile device with buffer queue stability and battery power as constraints. Based on the perturbation Lyapunov optimization algorithm, optimal allocations of a cycle frequency of a CPU and a data transmission power of the mobile device are obtained.

The above processing is performed for improving the original, simple and centralized network architectures, that is, the average rate, the delay, the connection density and the differentiated services based on the network architectures should be improved. In particular, with the rapid growth of edge devices and the amount of data in the era of Internet of Things, the centralized optimization method is no longer suitable for distributed MEC scenarios including thousands of applications of heterogeneous Internet of Things. In addition, different MDs usually have different requirements in computing offload delay and energy consumption. Therefore, how to allocate limited computing resources of an edge cloud on demand and how to distributedly develop a task offload strategy based on energy harvesting have important research value.

SUMMARY

In order to minimize system energy consumption and allocate resources on demand, a distributed task offloading and computing resources management method based on energy harvesting is provided according to the present disclosure. The management method includes: establishing, based on a mobile edge computing environment, a task local computing model and an edge cloud computing model; obtaining a benefit obtained by a device purchasing resources from each of mobile edge computing servers for performing task offloading, performing a perturbation Lyapunov optimization algorithm at the device to ensure an energy level of a battery and stability of a task queue at the device, and establishing a device maximum benefit objective function for the device based on the perturbation Lyapunov optimization algorithm; for each of the mobile edge computing servers, obtaining a benefit of the mobile edge computing server providing a computing service for the device, and establishing a mobile edge computing server maximum benefit objective function for the mobile edge computing server; determining, based on a task backlog of the device, the energy level of the battery of the device and a quotation of each of the mobile edge computing servers, a mobile edge computing server pre-screening criteria, and pre-selecting, by the device based on the pre-screening criteria, a mobile edge computing server for performing task offloading; calculating, by the device based on the maximum benefit by using the perturbation Lyapunov optimization algorithm, an optimal task size strategy for performing task offloading by the device to the pre-selected mobile edge computing server based on a Lagrange multiplier algorithm and a KKT condition in each of time slots; obtaining, by the mobile edge computing server based on the optimal quotation strategy for performing task offloading by the device to the mobile edge computing server, an optimal quotation strategy of the mobile edge computing server for the device in each of the time slots based on the maximum benefit of the mobile edge computing server; and in a case that the optimal task size strategy for performing task offloading by the device to the pre-selected mobile edge computing server meets a Stackelberg equilibrium and the optimal dynamic quotation strategy of the mobile edge computing server for the device meets the Stackelberg equilibrium, performing, by the device, task offloading to the mobile edge computing server based on an optimal task offloading strategy.

In an embodiment, a device maximum benefit objective function for the device based on the perturbation Lyapunov optimization algorithm is expressed as:

$$\max_{I_i(t),b_i(t),e_i^h(t)} U_{b_i}(t) = V_i u_{b_i}(t) + q_i(t)[b_i(t) - a_i(t)] + \tilde{B}_i(t)\left[e_{i0}^t(t) - e_i^h(t)\right]$$

and constraints include:

$$0 \le e_i^h(t) \le \delta_i(t)$$

$$E_i^{min} \le e_{i0}^t(t) \le \max\{E_i^{max}, B_i(t)\} < \infty$$

$$0 \le \sum_{\forall j} b_{ij}(t) \le Q_i(t), \forall\, i \in M, \hat{j} \in \{0, N\}$$

$$f_{\hat{j}}^{min} \le f_{i\hat{j}}(t) \le f_{\hat{j}}^{max}, \forall\, i \in M, \hat{j} \in \{0, N\}$$

$$\overline{Q}_i = \lim_{T \to \infty} \sup \frac{1}{T} \sum_{t=0}^{T-1} E\{Q_i(t)\} < \infty$$

where $I_i(t) = \{I_{i0}(t), I_{i1}(t), \ldots, I_{in}(t)\}$ representing a set of task offloading strategies of an i-th mobile device; $b_i(t) = \{b_{i0}(t), b_{i1}(t), \ldots, b_{in}(t)\}$ representing a set of processing task size strategies of the i-th mobile device; $U_{b_i}(t)$ represents a device maximum benefit objective function for the i-th mobile device based on the perturbation Lyapunov optimization algorithm; $V_i$ represents a non-negative controllable parameter of the i-th mobile device; $u_{b_i}(t)$ represents a maximum benefit function of the i-th mobile device; $Q_i(t)$ represents an task queue backlog of the i-th mobile device in a time slot t;

$$b_i(t) = \sum_{j=0}^{N} b_{ij}(t)$$

representing a sum of tasks processed by the i-th mobile device in the time slot t; $a_i(t)$ represents the size of tasks of the i-th mobile device arrived in the time slot t; $\tilde{B}_i(t)$ represents a virtual energy queue of a battery of the i-th mobile device; $e_{i0}^r(t)$ represents total energy consumption of the i-th mobile device in the time slot t; $e_i^h(t)$ represents energy charged to the battery of the i-th mobile device in the time slot t; $\delta_i(t)$ represents energy harvested by the i-th mobile device in the time slot t; $E_i^{min}$ represents a minimum battery discharge of the i-th mobile device in each of time slots; $E_i^{max}$ represents a maximum battery discharge of the i-th mobile device in each of the time slots; $B_i(t)$ represents an energy level of the battery of the i-th mobile device at a beginning of the time slot t; $b_{ij}(t)$ represents the size of task locally processed by the i-th mobile device or offloaded by the i-th mobile device to a j-th mobile edge computing server, where $\hat{j} \in \{0, 1, \ldots, N\}$; M represents a set of mobile devices; N represents a set of mobile edge computing servers; $f_{\hat{j}}^{min}$ represents a local CPU minimum frequency or a CPU minimum frequency of the $\hat{j}$-th mobile edge computing server; $f_{i\hat{j}}(t)$ represents a local CPU frequency or a CPU frequency of the $\hat{j}$-th mobile edge computing server allocated for the i-th mobile device; $f_{\hat{j}}^{max}$ represents a maximum local CPU frequency or a maximum CPU frequency of the $\hat{j}$-th mobile edge computing server; and T represents an index of a time slot.

In an embodiment, in the device maximum benefit objective function of the device based on the perturbation Lyapunov optimization algorithm, the i-th mobile device is capable of performing task computing locally only in a case that $f_{i0}^L(t) \le f_{i0}^U(t)$, and if the i-th mobile device is capable of performing task computing locally, an optimal local execution strategy is expressed as:

$$f_{i0}^* = \begin{cases} f_{i0}^L(t), \tilde{B}_i(t) < 0, f_{i0}^M(t) \le f_{i0}^L(t) \\ f_{i0}^M(t), f_{i0}^L(t) \le f_{i0}^M(t) \le f_{i0}^U(t) \\ f_{i0}^U, \tilde{B}_i(t) \ge 0 \text{ or } \tilde{B}_i(t) < 0, f_{i0}^M(t) \ge f_{i0}^L(t) \end{cases}$$

where $f^*_{i0}$ represents the optimal local execution strategy;

$$f_{i0}^M(t) = -\frac{A + \sqrt{A^2 - 8\tilde{B}_i(t)k_i\tau\left(Q_i(t) + \frac{V_i\rho_i}{\ln 2}\right)}}{4\tilde{B}_i(t)k_i\tau};$$

$k_i$ represents an effective energy coefficient related to a chip architecture of the i-th mobile device; $\tau$ represents a length of each of the time slots; $\rho_i$ represents a benefit weight factor of the i-th mobile device;

$$A = 2\tilde{B}_i(t)k_i\gamma_i + Q_i(t)\frac{\tau}{\gamma},$$

where $\gamma_i$ represents a computation density obtained by performing offline measurement.

In an embodiment, the mobile edge computing server maximum benefit objective function is expressed as:

$$\max_{I_j(t),p_j(t),f_j(t)} U_{s_j}(t) = \sum_{i=1}^{m}\left(s_{ij}(t) - \psi_j e_{ji}^p(t)\right)$$

and a constraint is $p_{ji}(t) \ge 0$, $i \in M$, $t \in T$
where $U_{s_j}(t)$ represents a maximum benefit function of the j-th mobile edge computing server; $s_{ji}(t)$ represents a benefit obtained by the j-th mobile edge computing server processing a task for the i-th mobile device; $\psi_j$ represents unit energy cost of the j-th mobile edge computing server; $e_{ji}^p(t)$ represents energy consumption of the j-th mobile edge computing server processing the task of the i-th mobile device; and m represents the number of mobile devices in a mobile device set.

In an embodiment, the pre-selecting, by the device based on the pre-screening criteria, a mobile edge computing server for performing task offloading includes:
 in a case that $b_{ij}^L(t) \le b_{ij}^U(t)$, offloading, by a mobile device, a task to a j-th mobile edge computing server;
 in a case that $b_{ij}^L(t) > b_{ij}^U(t)$, excluding a j-th mobile edge computing server; and
 in a case that $b_{ij}(t) = b_{ij}^{min}(t)$,
  for an i-th mobile device,
   if a quotation of the j-th mobile edge computing server meets $$p_{ij}(t) < \frac{\rho_i}{\left(1 + b_{ij}^{min}(t)\right)\ln 2} - \varphi_{ij} + \frac{Q_{ij}(t) + \tilde{B}_i(t)\frac{P_i}{r_i}}{V_i},$$

offloading, by the mobile device, a task to a j-th mobile edge computing server; and if a quotation of the j-th mobile edge computing server does not meet $$p_{ij}(t) \geq \frac{\rho_i}{(1+b_{ij}^{min}(t))\ln 2} - \varphi_{ij} + \frac{Q_{ij}(t) + \tilde{B}_i(t)\frac{P_i}{r_i}}{V_i},$$

excluding a j-th mobile edge computing server;

where $b_{ij}^L(t)$ represents the smallest size of offloading tasks in each of time slots; $b_{ij}^U(t)$ represents the maximum size of offloading tasks in each of the time slots; $b_{ij}^{min}(t)$ represents the minimum size of tasks offloaded from the i-th mobile device to the j-th mobile edge computing server; $p_{ij}(t)$ represents the quotation of the j-th mobile edge computing server to the i-th mobile device; $\varphi_{ij}$ represents unit communication cost from the i-th mobile device to the j-th mobile edge computing server in a time slot t; $Q_{ij}(t)$ represents a task queue backlog of the i-th mobile device; $\tilde{B}_i(t)$ represents a virtual energy queue of the battery of the i-th mobile device; $P_i$ represents a transmission power of the i-th mobile device in the time slot t; and $r_i$ represents a transmission rate of the i-th mobile device.

In an embodiment, the device calculates, based on the maximum benefit by using the perturbation Lyapunov optimization algorithm, the optimal task size strategy for performing task offloading by the device to the pre-selected mobile edge computing server based on the Lagrange multiplier algorithm and the KKT condition in each of the time slots, that is, the optimal quotation strategy of the mobile edge computing server for the device in each of the time slots is expressed as:

$$p_{ji}^*(t) = \frac{C^2}{\rho_i \ln 2} b_{ij}^*(t) - 2\psi_j k_j b_{ij}^* \frac{\gamma_i^2}{\tau}$$

where $p^*_{ji}(t)$ represents the optimal quotation strategy of the mobile edge computing server for the device in each of the time slots, and $b^*_{ij}(t)$ represents the optimal size of tasks offloaded by the i-th mobile device to the mobile edge computing server in a time slot t.

In embodiment, the optimal size $b^*_{ij}(t)$ of tasks offloaded by an i-th mobile device to the mobile edge computing server in a time slot t is expressed as:

$$b_{ij}^*(t) = \begin{cases} b_{ij}^L(t), & b_{ij}^M(t) \leq b_{ij}^L(t) \\ b_{ij}^M(t), & b_{ij}^L(t) \leq b_{ij}^M(t) \leq b_{ij}^U(t) \\ b_{ij}^U(t), & b_{ij}^M(t) \geq b_{ij}^U(t) \end{cases}$$

where, $b_{ij}^M(t) = \frac{\rho_i}{C} - 1$, $C = \varphi_{ij}\ln 2 + p_{ij}(t)\ln 2 - \frac{\ln 2}{V_i}\left(Q_i(t) + \tilde{B}_i(t)\frac{P_i}{r_i}\right), P_{ij}(t)$ represents a quotation of a j-th mobile edge computing server for the i-th mobile device, $Q_i(t)$ represents a a task queue backlog of the i-th mobile device, and $P_i$ represents a transmission power in the time slot t.

In an embodiment, it is determined whether the optimal dynamic quotation strategy of the mobile edge computing server for the device meets the Stackelberg equilibrium solution by: in a case that a quotation of the mobile edge computing server is determined and the following equation holds:

$$U_{b_i}(b_{ij}^{SE}(t)) = \sup_{b_{ij}^{min}(t) \leq b_{ij}(t) \leq b_{ij}^{max}(t)} \{U_{b_i}(b_{ij}(t))\}$$

and an offloading task $b_{ij}(t)$ is determined and the following equation holds:

$$U_{s_j}(p_{ij}^{SE}(t)) = \sup_{p_{ij}(t) \geq p_{ij}^c(t)} \{U_{s_j}(p_{ij}(t))\}$$

determining that the optimal dynamic quotation strategy of the mobile edge computing server for the device meets the Stackelberg equilibrium solution;

where $U_{b_i}(b_{ij}^{SE}(t))$ represents a benefit of an i-th mobile device, where $b_{ij}^{SE}(t)$ represents the size of the offloading task; $b_{ij}^{SE}(t)$ represents a Stackelberg equilibrium solution of the size of tasks offloaded from the i-th mobile device to the j-th mobile edge computing server; $b_{ij}^{min}(t)$ represents the minimum size of offloading tasks; $b_{ij}^{max}(t)$ represents the maximum size of offloading tasks; $U_{s_j}(p_{ij}^{SE}(t))$ represents a benefit of a j-th mobile edge computing server, where $p_{ij}^{SE}(t)$ represents a quotation; $p_{ij}^{SE}(t)$ represents a Stackelberg equilibrium solution of the quotation of the j-th mobile edge computing server for the i-th mobile device; and $p_{ij}^c(t)$ represents a cost price of the i-th mobile device performing task offloading to the j-th mobile edge computing server.

In an embodiment, the cost price $p_{ij}^c(t)$ of the i-th mobile device performing task offloading to the j-th mobile edge computing server is expressed as:

$$p_{ij}^c(t) = \psi_j k_j b_{ij}^*(t) \frac{\gamma_i^2}{\tau}$$

According to the present disclosure, a distributed MEC offloading system supporting energy harvesting is considered, and a distributed optimization strategy based on a game theory and a perturbation Lyapunov optimization theory is provided. With the present disclosure, a dynamic differential quotation mechanism is performed, achieving joint optimization of heterogeneous task offloading, computing resources allocation on demands and battery energy management. In addition, in order to reduce unnecessary communication overhead and improve processing efficiency, a pre-screening criterion for a MEC server is provided based on the energy level of the battery, delay and benefit. It can be seen that based on simulation experiments, with the method according to the present disclosure, the stability management of the energy level of the battery and the on-demand allocation of computing resources for heterogeneous users can be achieved with ensuring the maximization of the system revenue.

DETAILED DESCRIPTION

A distributed task offloading and computing resources management method based on energy harvesting is provided according to an embodiment of the present disclosure. With the method according to the embodiment of the present disclosure, a dynamic differential quotation mechanism is performed, achieving joint optimization of heterogeneous task offloading, computing resources allocation on demands and battery energy management.

The embodiments of the present disclosure are described hereinafter in combination with the drawings.

In the specification, claims, and drawings of the present disclosure, the terms "first", "second", and so on are intended to distinguish between similar objects rather than indicating a specific order. It should be understood that the terms used in this way are interchangeable in an appropriate case, and this is merely a differentiation manner used when objects having a same attribute are described in the embodiments of the present disclosure. In addition, the terms "include", "comprise" and any other variants are intended to cover the non-exclusive inclusion, so that a process, method, system, product, or device that includes a series of units is not necessarily limited to those units, but may include other units not expressly listed or inherent to such a process, method, product, or device.

Figure 1:
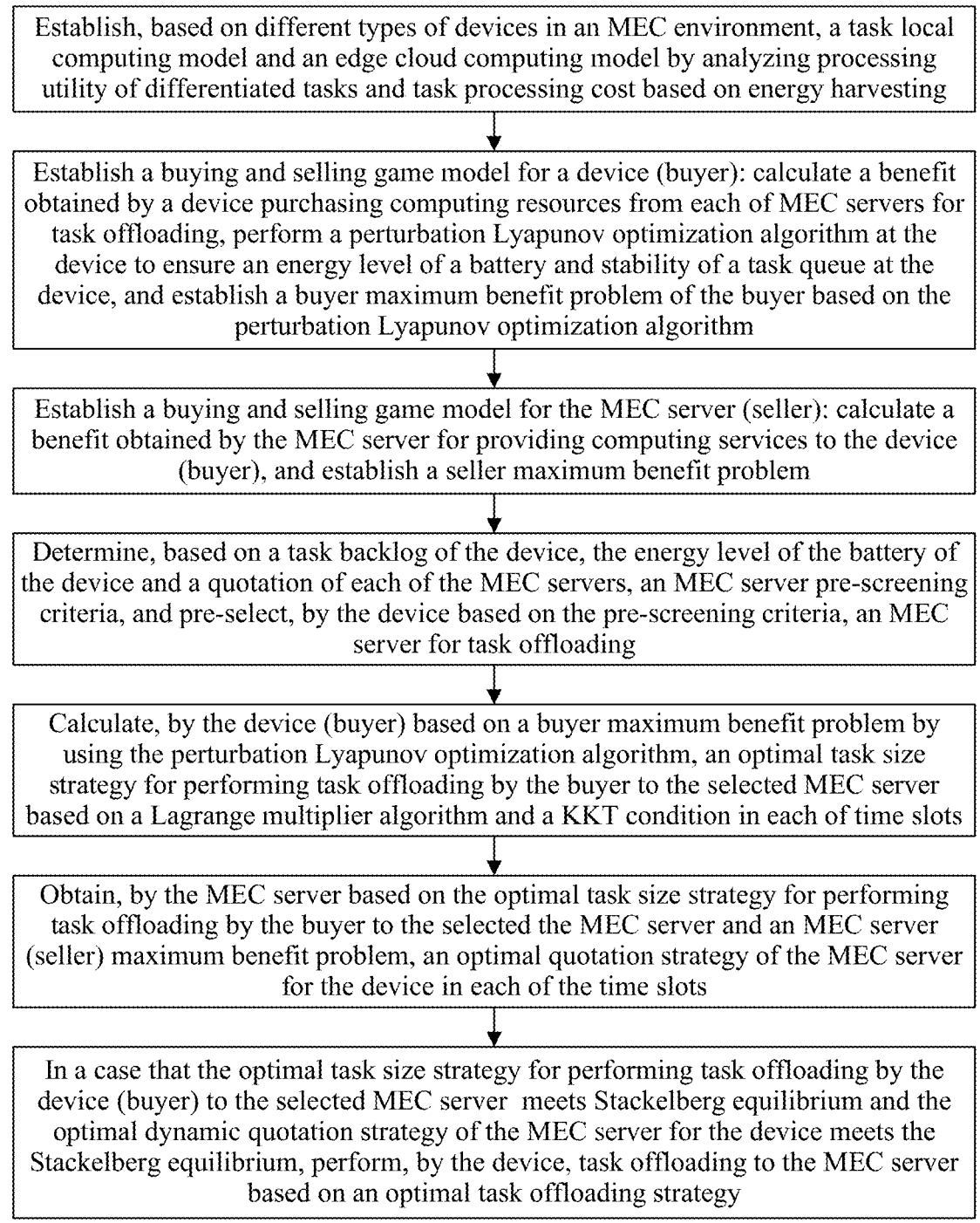
FIG. 1 is a flow chart of a distributed task offloading and computing resources management method based on energy harvesting according to the present disclosure.

Exemplarily, a distributed task offloading and computing resources management method based on energy harvesting is provided according to the present disclosure. As shown in FIG. 1, the method includes the following operations. A task local computing model and an edge cloud computing model are established based on a mobile edge computing environment. A benefit obtained by a device purchasing resources from each of mobile edge computing servers for performing task offloading is obtained, a perturbation Lyapunov optimization algorithm is performed at the device to ensure an energy level of a battery and stability of a task queue at the device, and a device maximum benefit objective function for the device is established based on the perturbation Lyapunov optimization algorithm. For each of the mobile edge computing servers, a benefit of the mobile edge computing server providing a computing service for the device is obtained, and a mobile edge computing server maximum benefit objective function is established. Based on a task backlog of the device, the energy level of the battery of the device and a quotation of each of the mobile edge computing servers, a mobile edge computing server pre-screening criteria is determined, and the device pre-selects a mobile edge computing server for performing task offloading based on the pre-screening criteria. The device calculates, by based on the maximum benefit by using the perturbation Lyapunov optimization algorithm, an optimal task size strategy for performing task offloading by the device to the pre-selected mobile edge computing server based on a Lagrange multiplier algorithm and a KKT condition in each of time slots. The mobile edge computing server obtains, based on the optimal quotation strategy for performing task offloading by the device to the mobile edge computing server, an optimal quotation strategy of the mobile edge computing server for the device in each of the time slots based on the maximum benefit of the mobile edge computing server. In a case that the optimal task size strategy for performing task offloading by the device to the pre-selected mobile edge computing server meets a Stackelberg equilibrium and the optimal dynamic quotation strategy of the mobile edge computing server for the device meets the Stackelberg equilibrium, the device performs task offloading to the mobile edge computing server based on an optimal task offloading strategy.

In the embodiment, the above steps are further described from constructing a system model, constructing a to-be-solved resource allocation problem, and how to allocate computing resources.

1. System Model

Figure 2:
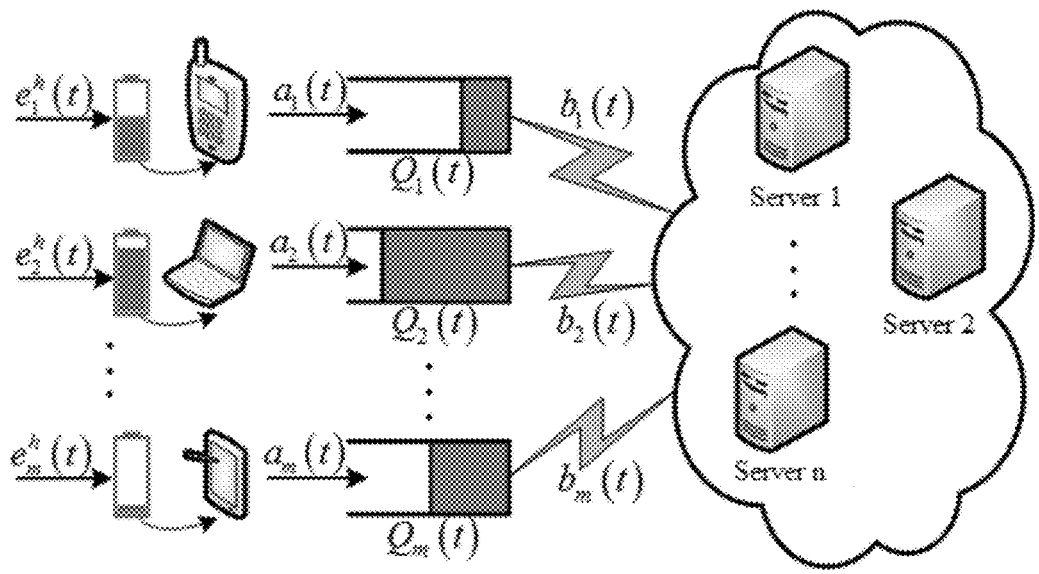
FIG. 2 shows a model of an MEC offloading system supporting energy harvesting.

Exemplarily, as shown in FIG. 2, a MEC network system supporting energy harvesting is considered in the present disclosure. The MEC network system includes M heterogeneous mobile devices each of which is arranged with an energy harvesting component, where $M=\{1, 2, \ldots, m\}$. Different mobile devices have different computing requirements, such as different offloading delays and energy constraints. Each of N MEC servers may provide computing services or data analysis services for the MDs within a radio coverage range of the MEC server, where $N=\{1, 2, \ldots, n\}$. Each of the MDs may compute a task locally or offload the task to an MEC server. Assuming that the system operates in discrete time slots, z represent a length of each of the time slots, and $T \in \{0, 1, \ldots\}$ representing an index of a time slot.

(1) Task and Queue Model

Exemplarily, MDi represents an i-th mobile device. A to-be-processed task requested by the MDi may be represented by a triple $\Lambda_i(t) = \left(b_i(t), \tau_i^d, \gamma_i\right)$, where $b_i(t)$ represents the size of tasks have been processed in a time slot t, $\tau_i^d$ represents a requirement for a maximum computation delay, and $\gamma_i$, in cycles/bit, represents a calculation density obtained by performing offline measurement.

Exemplarily, it is assumed that tasks generated by the MDs follow an independent and identically distributed Poisson process, $a_i(t)$ represents the size of tasks of the MDi arrived in the time slot t, and $Q_i(t)$ represents an task queue backlog of the MDi in the time slot t. Thus, $A(t) = \{a_1(t), \ldots, a_m(t)\}$ representing a set of tasks of all the MDs arrived in the time slot t, and $Q(t) = \{Q_i(t), \ldots, Q_m(t)\}$ representing a set of queue backlogs of all the MDs in the time slot t. Since the tasks arrived in a time slot are limited, the size $a_i(t)$ of the arrived tasks is greater than or equal to zero and less than or equal to $a_i^{max}(t)$, where $a_i^{max}(t)$ represents the maximum size of tasks of the i-th mobile device arrived in the time slot t. $E\{A(t)\} = \{\lambda_1, \ldots, \lambda_m\}$ representing a set of arrival rates of the MDs, that is, $\lambda_m$ represents an arrival rate of an m-th mobile device. An update equation of the queue task backlog of the MDi may be expressed as:

$$Q_i(t+1) = \max\{Q_i(t) - b_i(t), 0\} + a_i(t)$$

In some embodiments, task offloading includes the following three stages: in a first stage, an MD uploads a computing task to an MEC server through a wireless channel; in a second stage, the MEC server analyzes and performs the task; and in a third stage, a computation result is returned to the MD.

Since the amount of the data in the computation result is much less than the amount of the uploaded data and the downlink date transmission rate is much higher the uplink date transmission rate, the delay for returning the computation result is ignored in the present disclosure.

(2) Local Computing Model

In some embodiments, at a beginning of each of time slots, the MDs determine whether to perform task offloading and the size of the tasks to be offloaded. In a case of local computing, it is required for an MD to allocate local CPU computing resources to process tasks. In order to save energy under delay constraint, the MDs should process tasks at a dynamic and appropriate CPU clock speed, which may be achieved by adjusting a processing frequency of a CPU by using a dynamic voltage and frequency scaling (DVFS) technology.

Exemplarily, $$b_{i0}(t) = \int_\tau \frac{f_{i0}(t)}{\gamma_i} dt$$

representing the size of tasks in local computing in the time slot t, where $f_{i0}(t)$ represents a CPU frequency of the MDi. Since the CPU frequency is limited by a maximum CPU frequency $f_{i0}^{max}$ and a minimum CPU frequency $f_{i0}^{min}$, it is required for the CPU frequency $f_{i0}(t)$ to meet $f_{i0}^{min} \leq f_{i0}(t) \leq f_{i0}^{max}$.

A local computing energy consumption model is obtained. Due to the limitation of the energy level of the battery, an energy consumption factor is considered in performing task processing and offloading decision. For local task processing, in order to facilitate analysis, it is assumed that the CPUs of the MDs are completely used for computing tasks and other energy consumption due to the operations of the MDs are ignored according to the present disclosure. Computing energy consumption of processing a task $b_{i0}(t)$ may be expressed as:

$$e_{i0}^p(f_{i0}(t)) = \kappa_i \int_\tau (\alpha(f_{i0}(t))^\sigma + \beta) dt$$

where $K_i$ represents an effective energy coefficient related to a chip architecture, $\alpha$ and $\beta$ represent parameters determined by a CPU model, and a ranges from 2 to 3. In order to facilitate analysis, it is assumed according to the present disclosure that $\alpha=1$, $\beta=0$, and $\sigma=2$.

(3) Edge Cloud Computing Model

In the embodiment of the present disclosure, compared with the MDs, the MEC server has stronger power supply capacity, computing capacity and storage capacity. In a case that one of the MDs determines to perform task offloading, a task is to be transmitted to a server through a wireless channel, and then the server allocates appropriate computing resources for the MD. A communication model, a communication energy consumption model a communication cost model of the MDs, an computing delay model of an MEC server, and an edge computing energy consumption model are analyzed below.

For the communication model, $h_i(t)=[l(t)]^o$ representing a gain of a wireless channel in the time slot t, where $l(t)$ represents a communication distance, and $o \in \{2, 3\}$ and is a constant. Based on Shannon's theory, a task transmission rate of the MDi in the time slot t is expressed as:

$$r_i = B_i \log_2\left(1 + \frac{P_i h_i}{\omega}\right)$$

where $B_i$, P and $\omega$ respectively represent a transmission bandwidth, a transmission power and an average noise power in the time slot t. For the MDi, $I_{ij}(t) \in \{0,1\}$ representing an indicator for determining a task offloading strategy, where $j \in N$, and $I_{ij}(t)=1$ representing that the MDi offloads the task to the MEC server in the time slot t. Therefore, the transmission delay of the MDi is expressed as:

$$d_{ij}^c(t) = \frac{b_{ij}(t) \cdot 1\{I_{ij}(t) = 1\}}{r_i}$$

where $1\{\cdot\}$ represents an indicator function.

For the communication energy consumption model, communication energy consumption of the MDi offloading a computing task $b_{ij}(t)$ to a j-th MEC server is expressed as:

$$c_{ij}(t) = \varphi_{ij}(t) b_{ij}(t) \cdot 1\{I_{ij}(t)=1\}$$

For the communication cost model, $\Omega_{ij}(t)$ represents unit communication cost from the MDi to the j-th MEC server in the time slot t. According to the present disclosure, the communication cost model is defined as:

$$c_{ij}(t) = \varphi_{ij}(t) b_{ij}(t) \cdot 1\{I_{ij}(t)=1\}$$

For the computing delay model of an MWC server, $f_{ij}(t)$ represents a CPU frequency of the j-th MEC server allocated for the MDi in the time slot t. Considering that the CPU frequency is limited by a maximum CPU frequency $f_j^{max}$ and a minimum CPU frequency $f_j^{min}$ and the CPU frequency $f_{ij}(t)$ meets $f_j^{min} \leq f_{ij}(t) \leq f_j^{max}$, a computing delay of the j-th MEC server is expressed as:

$$d_{ij}^p(t) = \frac{b_{ij}(t) \cdot 1\{I_{ij}(t) = 1\}}{\gamma_i f_{ij}(t)}$$

For the edge computing energy consumption model, the computing energy consumption of the j-th MEC server processing the task $b_{ij}(t)$ may be expressed as:

$$e_{ij}^p(t) = \kappa_j \int_{\Delta t} (f_{ij}(t))^2 dt$$

where $\Delta t = d_{ij}^p(t)$ representing a processing delay of the j-th MEC server.

(4) Energy Harvesting Model

In some embodiments, each of the MDs arranged with an EH component may acquire renewable energy to power the battery. It is assumed that in different time slots, an energy harvesting process of an MD follows an independent and identically distribution, $\delta_i(t)$ represents energy harvested by the MDi in the time slot t, and $\delta_i^{max}$ represents maximum harvested energy. In practices, only a part of the harvested energy can be stored in the battery, $e_i^h(t)$ represents energy charged by the MDi to the battery in the time slot t, and thus $e_i^h(t)$ meets $0 \leq e_i^h(t) \leq \delta_i(t)$.

Exemplarily, based on the analysis of the local computing model and the edge cloud computing model, total energy consumption of the MDi in the time slot t may be expressed as:

$$e_{i0}^t(t) = e_{i0}^p(t) + \sum_{j=1}^n e_{ij}^c(t) \cdot 1\{I_{ij}(t) = 1\}$$

In order to prevent the battery from being over-discharged, a battery discharge constraint is defined as:

$$E_i^{min} \leq e_{i0}^t(t) \leq E_i^{max}$$

where $E_i^{min}$ represents a minimum discharge capacity of the battery of the MDi in each of the time slots, and $E_i^{max}$ represents a maximum discharge capacity of the battery of the MDi in each of the time slots.

In particular, in order to ensure continuous operation of the MDs, it is required for the energy level of the battery to be sufficient for performing task computing locally and communication. $B_i(t)$ represents an energy level of the battery of the MDi at the beginning of the time slot t, and thus the energy consumption of the MDi in the time slot t meets a constraint of $E_i^{min}(t) \leq e_{i0}^r(t) \leq \max\{E_i^{max}, B_i(t)\} < \infty$. If the constraint is not met, the task is to be backlogged in a local task queue. Based on the above analysis, an update equation of the energy level of the battery of the MDi may be obtained as follows:

$$B_i(t+1) = \max\{B_i(t) - e_{i0}^r(t)_2 0\} + e_i^h(t)$$

(5) Task Processing Utility Model

In an embodiment of the present disclosure, in order to evaluate the benefit obtained by the MDi processing the task in time slot t, a logarithmic utility function, which is widely used in the field of wireless communication and mobile computing, is adopted in the present disclosure. The benefit obtained by the MDi processing the task in time slot t may be expressed as:

$$u_{ij}(t) = \rho_i \log(1 + b_{ij}(t)), j \in \{0, N\}$$

where $\rho_i$ represents an benefit weight factor of the MDi.

2. Objective Function

In the embodiments of the present disclosure, it is required for the MEC offloading system supporting EH to ensure that each of the MDs has sufficient energy to execute the offloading strategy, and it is required that in each of the time slots, requirements for stability of a task queue of each of the MDs and task offloading delay of each of the MDs are met. Accordingly, in the present disclosure, an offloading decision of the MEC offloading system, the size of processed tasks, a resource allocation strategy and an energy harvesting strategy in the time slot t are respectively expressed as:

$$I(t) = \{I_{ij}(t)\}_{i \in M, j \in N}$$

$$b(t) = \{b_{ij}(t)\}_{i \in M, j \in \{0,N\}}$$

$$F(t) = \{f_{ij}(t)\}_{i \in M, j \in \{0,N\}}$$

$$e(t) = \{e_i^h(t)\}_{i \in M}$$

Based on the task offloading, resource allocation and energy consumption in each of the time slots, a maximum benefit model, that is, the objective function in the embodiments, may be obtained as follows:

$$\max_{I_i(t), b_i(t), e_i^h(t)} U_{b_i}(t) = V_i u_{b_i}(t) + Q_i(t)[b_i(t) - a_i(t)] + \tilde{B}_i(t)[e_{i0}^r(t) - e_i^h(t)] \quad P1$$

and the constraints include:

$$0 \leq e_i^h(t) \leq \delta_i(t)$$

$$E_i^{min} \leq e_{i0}^r(t) \leq \max\{E_i^{max}, B_i(t)\} < \infty$$

$$0 \leq \sum_{\forall j} b_{ij}(t) \leq Q_i(t), \forall i \in M, \hat{j} \in \{0, N\}$$

-continued $$f_j^{min} \leq f_{ij}(t) \leq f_j^{max}, \forall i \in M, \hat{j} \in \{0, N\}$$

$$\overline{Q}_i = \lim_{T \to \infty} \sup \frac{1}{T} \sum_{t=0}^{T-1} E\{Q_i(t)\} < \infty$$

where, $\psi_j$ represents unit energy cost of the j-th MEC server.

In the above model, the constraints are sequentially understood as: the energy charged by the MDi to the battery is less than the energy harvested in the time slot t; the energy consumed by the MDi in the time slot t is required to be greater than the minimum discharge capacity and be less than a maximum value of the maximum discharge capacity and the energy level of the battery; the MDi ensures that a sum of local computing tasks and offloading tasks is less than or equal to the queue backlog in the time slot t; the CPU frequency allocated for the MDi or the CPU frequency allocated for the MEC server is less than or equal to a maximum CPU frequency in each of the time slots and is greater than or equal to a minimum CPU frequency in each of the time slot; and the stability of the task queue backlog is met.

3. Distributed Task Offloading and Computing Resources Allocation Method Based on Energy Scavenging In the era of Internet of Things, massive edge devices and massive data are growing rapidly. It is difficult or even impossible to harvest real-time information about a state of a system. The conventional centralized optimization method is no longer suitable for distributed MEC scenarios with thousands of heterogeneous Internet of things applications. Due to the intermittence, heterogeneity and contingency of the arrived tasks and harvested energy, it is impossible to accurately predict the state of the system. Therefore, a distributed dynamic computing task offloading and computing resource allocation strategy based on a buying and selling game and a Lyapunov optimization theory is provided according to the present disclosure. With the strategy, a centralized optimization problem P1 is transformed to a distributed optimization problem P2.

(1) Analysis of Game Model Based on Perturbation Lyapunov Optimization

In the embodiments of the present disclosure, in order to process the tasks offloaded by the MDs, it is required for the MEC server to consume cost (such as computing energy consumption and hardware cost) of the MEC server, and the MDs are required to pay for computing services. Therefore, the model may be regarded as a "market", in which each of the MDs is purchasing a product from an appropriate MEC server. Therefore, an MD is regarded as a buyer (b), which purchases computing resources to process the offloaded tasks; and an MEC server is regarded as a seller (s), which provides computing services for buyers.

In some embodiments, a payment by a purchaser (that is, an MD) is proportional to the size of tasks offloaded to a seller (that is, an MEC server). In a time slot t, a unit price of an MDi for offloading tasks to a j-th MEC server is represented by $p_{ij}(t)$ (in \$/bit). Therefore, a payment cost of a buyer for offloading tasks to a seller is expressed as:

$$s_{ij}(t) = p_{ij}(t) b_{ij}(t)$$

(i) Analysis of Buyer/MD Game Model

Exemplarily, it is assumed that the MDs are rational and want to maximize benefits of the MDs. An optimal strategy for the buyer is determined based on benefits of performing task offloading, communication cost and payment cost.

Therefore, an objective function of a buyer in the time slot t may be obtained as follows:

$$u_{b_i}(t) = \sum_{\forall j} \{u_{ij}(t) - c_{ij}(t) - s_{ij}(t)\}$$

Further, in order to achieve the stability of the energy level of the battery and ensure a computational performance in long-term evolution, a maximum benefit function of an i-th buyer (that is, MDi) may be obtained as follows:

$$\max_{I_i(t), b_i(t), e_i^h(t)} u_{b_i}(t) = \lim_{T \to +\infty} \frac{1}{T} E\left[\sum_{t=0}^{T-1}\left\{\sum_{\forall j}(u_{ij}(t) - c_{ij}(t) - s_{ij}(t))\right\}\right] \quad \text{P2-buyer}$$

the constraints include:

$$0 \leq e_i^h(t) \leq \delta_i(t)$$

$$E_i^{min} \leq e_{i0}^t(t) \leq \max\{E_i^{max}, B_i(t)\} < \infty$$

$$0 \leq \sum_{\forall \hat{j}} b_{i\hat{j}}(t) \leq Q_i(t), \forall i \in M, \hat{j} \in \{0, N\}$$

$$f_{\hat{j}}^{min} \leq f_{i\hat{j}}(t) \leq f_{\hat{j}}^{max}, \forall i \in M, \hat{j} \in \{0, N\}$$

$$\overline{Q}_i = \lim_{T \to \infty} \sup \frac{1}{T} \sum_{t=0}^{T-1} E\{Q_i(t)\} < \infty$$

In the embodiments of the present disclosure, compared with the conventional MEC system with a battery-powered device, the design of the offloading strategy for the MEC system supporting EH is much more complex, in which both the energy level of the battery and the task cache queue backlog are required to be considered. Hereinafter, a task offloading and energy management method based on a perturbation Lyapunov optimization algorithm is designed for the buyer.

In the progressive optimization based on the Lyapunov optimization algorithm, it should be noted that the energy level of the battery is time-independent according to the following battery energy causality constraint:

$$E_i^{min} \leq e_{i0}^t(t) \leq E_i^{max} \text{ and } B_i(t+1) = \max\{B_i(t) - e_{i0}^t(t), 0\} + e_i^h(t)$$

Therefore, two important parameters are defined, including a perturbation parameter $\theta_i$ and a virtual energy queue $\tilde{B}_i(t)$ of the battery of the MDi.

In the embodiment, the perturbation parameter $\theta_i$ is set as a bounded constant:

$$\theta_i \geq \tilde{E}_i^{max} + V_i(E_i^{min})^{-1}$$

where $\tilde{E}_i^{max} = \min\left\{k_i(f_{i0}^{max})^2 \tau_i^d + \sum_{j=1}^n P_i \tau_i^d, E_i^{max}\right\}$.

In implementation, $\tilde{B}_i(t) = B_i(t) - \theta$ representing the virtual energy queue for tracking the energy level of the battery of the MDi. By setting $\theta_i$ reasonably, it is ensured that the battery has sufficient power for supporting MDi to perform local computing and communication tasks.

In some embodiments, the energy level of the battery of the MDi meets $0 \leq B_i(t) \leq \theta_i + \delta_i^{max}$ in each of the time slots.

Exemplarily, a Lyapunov function for calculating the task queue and the virtual energy queue of the battery is defined as:

$$L[\Theta_i(t)] = \frac{1}{2}\{(Q_i(t))^2 + (\tilde{B}_i(t))^2\}$$

where $L[\Theta_i(t)] \geq 0$. Based on the Lyapunov optimization theory, a conditional Lyapunov drift may be obtained as the follows:

$$\Delta[\Theta_i(t)] = E\{L[\Theta_i(t+1)] - L[\Theta_i(t)] | Q_i(t), \tilde{B}_i(t)\}$$

An optimal decision is determined to minimize a difference between the conditional Lyapunov drift and an upper boundary of the maximum benefit function of the MDi, that is, minimize the difference of $\Delta[\Theta_i(t)] - V_i E\{u_{b_i}(t) | \Theta_i(t)\}$, where $V_i \geq 0$ representing a nonnegative controllable parameter. In order to obtain the upper boundary, the following operations are performed.

Exemplarily, based on any predetermined control parameters $V_i$, $a_i(t)$, and $e_i^h(t)$, where $V_i \geq 0$, $a_i(t) \in [0, a_i^{max}(t)]$ and $e_i^h(t) \in [0, \delta_i^{max}]$, the following inequalities are obtained based on the Lyapunov optimization theory:

$$\Delta[\Theta_i(t)] - V_i E\{u_{b_i}(t) | \Theta_i(t)\}$$

$$\leq E\{\tilde{B}_i(t)[e_i^h(t) - e_{i0}^t(t)] | \Theta_i(t)\}$$

$$+ E\{Q_i(t)[a_i(t) - b_{ij}(t)] | \Theta_i(t)\}$$

$$+ \Phi_i - V_i E\{u_{b_i}(t) | \Theta_i(t)\}$$

where $\Phi_i$ represents a nonnegative constant, and $$\Phi_i = \frac{1}{2}\{(E_i^{max})^2 + (\delta_i^{max})^2\} + \frac{1}{2}\{(b_i^{max}(t))^2 + (a_i^{max}(t))^2\}.$$

It can be seen that the operation of minimizing the difference between the conditional Lyapunov drift and the upper boundary of the maximum benefit function of the MDi is equivalent to an operation of minimizing the right side of the above inequality. The optimization problem P2-buyer may be transformed to a problem P2-buyer of maximizing the benefit of the buyer based on the perturbation Lyapunov optimization algorithm:

$$\max_{I_i(t), b_i(t), e_i^h(t)} U_{b_i}(t) = \quad \text{P2-buyer}$$

$$V_i u_{b_i}(t) + Q_i(t)[b_i(t) - a_i(t)] + \tilde{B}_i(t)\left[e_{i0}^t(t) - e_i^h(t)\right]$$

the constraints include:

$$0 \leq e_i^h(t) \leq \delta_i(t)$$

$$E_i^{min} \leq e_{i0}^t(t) \leq \max\{E_i^{max}, B_i(t)\} < \infty$$

$$0 \leq \sum_{\forall \hat{j}} b_{i\hat{j}}(t) \leq Q_i(t), \forall i \in M, \hat{j} \in \{0, N\}$$

$$f_{\hat{j}}^{min} \leq f_{i\hat{j}}(t) \leq f_{\hat{j}}^{max}, \forall i \in M, \hat{j} \in \{0, N\}$$

-continued $$\overline{Q}_i = \lim_{T \to \infty} \sup \frac{1}{T} \sum_{t=0}^{T-1} E\{Q_i(t)\} < \infty$$

(ii) Analysis of Seller/MEC Server Game Model

In some embodiments, $s_{ij}(t)$ represents a benefit obtained by the j-th MEC server for providing computing resources for the MDi. The benefit $s_{ji}(t)$ of the j-th MEC server in the time slot t is obtained by using the following equation:

$$s_{ji}(t) = s_{ij}(t) = p_{ij}(t) b_{ij}(t)$$

Exemplarily, the seller may obtain benefits by providing computing services to the buyers, and the seller consumes costs (such as computing energy consumption and hardware cost). Therefore, a maximum benefit function of a j-th seller may be obtained as follows:

$$\max_{I_j, p_i, f_j} u_{s_j}(t) = \lim_{T \to \infty} \frac{1}{T} E\left[\sum_{i=1}^{T-1}\left\{\sum_{i=1}^{m}\left(s_{ji}(t) - \psi_j^p \psi_{ji}^p(t)\right)\right\}\right] \quad \text{P2-seller}$$

the constraint is $p_{ji}(t) \geq 0$, $i \in M$, $t \in T$.

The constraint of the above model indicates that the price paid should be positive. In addition, based on a maximum value theory, the optimization problem P2-seller may be transformed to a problem P2-seller' of maximizing the benefit of the seller:

$$P2 - \text{seller}': \max_{I_j, p_i, f_j} u_{s_j}(t) = \sum_{i=1}^{m}\left(s_{ji}(t) - \psi_j e_{ji}^p(t)\right)$$

the constraint is $p_{ji}(t) \geq 0$, $i \in M$, $t \in T$.

(iii) Analysis of Optimal Game Strategy (a) Analysis of Buyer/MD Optimal Strategy For each of the MDs, it is required to solve the following three basic problems: how much of the harvested energy should be stored in the battery; how many tasks need to be computed locally; and how to select an appropriate MEC server and how many tasks should be offloaded to the MEC server.

Exemplarily, an optimal energy harvesting strategy is obtained. Based on P2-buyer', an optimal energy harvesting strategy is easily obtained as follows:

$$\max_{0 \leq e_i^h(t) \leq E_i^a} -\tilde{B}_i(t) e_i^h(t)$$

Therefore, an optimal harvested energy in the time slot t may be expressed as:

$$[e_i^t(t)]^* = \delta_i(t) \cdot l\{\tilde{B}_i(t) < 0\}$$

In a case that $\tilde{B}_i(t) \leq 0$, the maximum energy that the MDi needs to store is equal to $\delta_i$. In a case that $\tilde{B}_i(t) > 0$, the MDi does not store energy.

An optimal task offloading strategy is calculated. Based on P2-buyer' and $$\max_{0 \leq e_i^h(t) \leq E_i^a} -\tilde{B}_i(t) e_i^h(t),$$

the optimization problem is further transformed from P2-seller' to P2-buyer", where P2-buyer" is expressed s:

$$P2 - \text{buyer}'': \max_{I_i(t), b_i(t)} U_{b_i}(t) = V_i u_{b_i}(t) + Q_i(t)[b_i(t) - a_i(t)] + \tilde{B}_i(t) e_{i0}^t(t)$$

and the constraints include:

$$E_i^{min} \leq e_{i0}^t(t) \leq E_i^{max}$$

$$E_i^{min} \leq e_{i0}^t(t) \leq \max\{E_i^{max}, B_i(t)\} < \infty$$

$$0 \leq \sum_{\forall j} b_{ij}(t) \leq Q_i(t), \forall i \in M, \hat{j} \in \{0, N\}$$

$$f_j^{min} \leq f_{ij}(t) \leq f_j^{max}, \forall i \in M, \hat{j} \in \{0, N\}$$

$$\overline{Q}_i = \lim_{T \to \infty} \sup \frac{1}{T} \sum_{t=0}^{T-1} E\{Q_i(t)\} < \infty$$

In a local calculation strategy, for each of the MDs, due to a battery discharge limitation by the constraint of $E_i^{min} \leq e_{i0}^t(t) \leq E_i^{max}$, a minimum CPU frequency of the MDi under the energy constraint may be obtained as:

$$f_{i0}^U = \min\left\{f_{i0}^{max}, \sqrt{\frac{E_i^{max} - \sum_{j=1}^{n} P_i \frac{b_{ij}^*(t)}{r_i}}{k_i \tau_i^d}}\right\}$$

and a maximum CPU frequency of the MDi under the energy constraint may be obtained as:

$$f_{i0}^L = \max\left\{f_i^{min}, \sqrt{\frac{E_i^{min} - \sum_{j=1}^{n} P_i \frac{b_{ij}^*(t)}{r_i}}{k_i \tau_i^d}}\right\}$$

Only in a case that $f_{i0}^L(t) \leq f_{i0}^U(t)$, the MDi may perform local computing. Based on P2-buyer", in a case that the MDi may perform local computing, an optimal local execution strategy is expressed as:

$$f_{i0}^*(t) = \begin{cases} f_{i0}^L(t), \tilde{B}_i(t) < 0, f_{i0}^M(t) \leq f_{i0}^L(t) \\ f_{i0}^M(t), f_{i0}^L(t) \leq f_{i0}^M(t) \leq f_{i0}^U(t) \\ f_{i0}^U, \tilde{B}_i(t) \geq 0 \text{ or } \tilde{B}_i(t) < 0, f_{i0}^M(t) \geq f_{i0}^L(t) \end{cases} \text{ where } f_{i0}^M(t) = $$

$$\frac{A + \sqrt{A^2 - 8\tilde{B}_i(t) k_i \tau - \left(Q_i(t) + \frac{V_i \rho_i}{\ln 2}\right)}}{4\tilde{B}_i(t) k_i \tau}, \text{ and } A = 2\tilde{B}_i(t) k_i \gamma_i + Q_i(t) - \frac{\tau}{\gamma_i}.$$

In a case that $$\tilde{B}_i(t) < 0, \frac{\partial^2 U_{b_i}(t)}{\partial f_{i0}(t)^2} < 0.$$

In addition, the constraints of the problem P2-buyer" are all affine functions, thus $U_{b_i}(t)$ is a convex function for $f_{i0}(t)$.

Based on a Lagrange multiplier and a karush-Kuhn-Tucker (KKT) condition, a global optimal solution may be obtained by using the following equation:

$$f_{i0}^M(t)\Big|_{\frac{\partial U_{b_i}(t)}{\partial f_{i0}(t)}=0} = -\frac{A+\sqrt{A^2 - 8\tilde{B}_i(t)k_i\tau - \left(Q_i(t)+\frac{V_i\rho_i}{\ln 2}\right)}}{4\tilde{B}_i(t)k_i\tau}$$

In addition, in a case that $f_{i0}^L(t) \leq f_{i0}^M(t) \leq f_{i0}^U(t)$, the optimal decision is obtained by using the following equation:

$$f^*_{i0}(t) = f_{i0}^M(t)$$

In a case that $f_{i0}^M(t) \leq f_{i0}^L(t)$, the optimal decision is obtained by using the following equation:

$$f^*_{i0}(t) = f_{i0}^U(t)$$

In a case that $f^*_{i0}(t) > f_{i0}^U(t)$, the optimal decision is obtained by using the following equation:

$$f^*_{i0}(t) = f_{i0}^U(t)$$

In a case that $$\tilde{B}_i(t) \geq 0, \; \frac{\partial U_{b_i}(t)}{\partial f_{i0}(t)} > 0,$$

where $U_{b_i}(t)$ is a monotonically increasing function of $f_{i0}(t)$. Therefore, the optimal decision is obtained by using the following equation:

$$f^*_{i0}(t) = f_{i0}^U(t)$$

In edge cloud computing offloading strategy, at a beginning of each of the time slot, each of the MDs selects one or more appropriate MEC servers. For a selected MEC server j, an optimal offloading task size is expressed as:

$$b^*_{ij}(t) = \begin{cases} b_{ij}^L(t), & b_{ij}^M(t) \leq b_{ij}^L(t) \\ b_{ij}^M(t), & b_{ij}^L(t) \leq b_{ij}^M(t) \leq b_{ij}^U(t) \\ b_{ij}^U(t), & b_{ij}^M(t) \geq b_{ij}^U(t) \end{cases}$$

where $b_{ij}^M(t) = \frac{\rho_i}{C} - 1$, and $$C = \varphi_{ij}\ln 2 + p_{ij}(t)\ln 2 - \frac{\ln 2}{V_i}\left(Q_i(t) + \tilde{B}_i(t)\frac{P_i}{r_i}\right).$$

$b_{ij}^L(t)$ represents a smallest offloading task size under an energy constraint, and $b_{ij}^U(t)$ represents a maximum offloading task size under the energy constraint.

(b) Analysis of Seller/MEC Server Optimal Strategy

Exemplarily, for each of the sellers/MEC servers, a fundamental problem required to be solved is to determine an optimal price $p_{ij}(t)$ and computing resources $f_{ij}(t)$ according to requirements of the buyer. Based on P2-seller' and $$b^*_{ij}(t) = \begin{cases} b_{ij}^L(t), & b_{ij}^M(t) \leq b_{ij}^L(t) \\ b_{ij}^M(t), & b_{ij}^L(t) \leq b_{ij}^M(t) \leq b_{ij}^U(t), \\ b_{ij}^U(t), & b_{ij}^M(t) \geq b_{ij}^U(t) \end{cases}$$

a first-order partial derivative of $U_{s_j}(t)$ to $p_{ji}(t)$ is obtained as follows:

$$\frac{\partial U_{s_j}(t)}{\partial p_{ji}(t)} = b^*_{ij}(t) - p_{ji}(t)\frac{\rho_i}{C^2}\ln 2 + 2\psi_j k_j b^*_{ij}(t)\frac{\rho_i}{C^2}\frac{\gamma_{ij}^2}{\tau}\ln 2$$

Further, a second-order partial derivative of $U_{s_j}(t)$ to $p_{ji}(t)$ is obtained as follows:

$$\frac{\partial^2 U_{s_j}(t)}{\partial p_{ji}(t)^2} = -\frac{2\rho_i(\ln 2)^2}{C^2}\left\{\frac{B}{C\ln 2} + \frac{\psi_j k_j b^*_{ij}(t)\frac{\gamma_i^2}{\tau}}{C} + \psi_j k_j \frac{\gamma_i^2}{\tau}\frac{\rho_i}{C^2}\right\}$$

$$\text{where } \frac{Q_i(t) + \tilde{B}_i(t)\frac{P_i}{r_i}}{V_i} > \frac{\rho_i}{(1+b_{ij}^{min})\ln 2} - \varphi_{ij} - \psi_j k_j b_{ij}^{min}\frac{\gamma_i^2}{\tau}.$$

For each of the sellers, the benefit $U_{s_j}(t)$ is non-negative. In a case that $U_{s_j}(t)=0$, a cost price of a seller j may be obtained as follows:

$$p_{ij}^c(t) = \psi_j k_j b^*_{ij}(t)\frac{\gamma_i^2}{\tau}$$

which indicates that a lowest price the seller can accept is $p_{ij}^c(t)$.

In a case that a transaction price of the computing resources is greater than $p_{ij}^c(t)$, then $$\frac{\partial^2 U_{s_j}(t)}{\partial(p_{ji}(t))^2} < 0.$$

In an embodiment, the existence of Stackelberg Equilibrium is analyzed. In the analysis process, it is first proved that the optimal solution $(b^*_{ij}(t), p^*_{ij}(t))$ is a Stackelberg equilibrium (SE). For the convenience of analysis, only a solution of an optimal offloading task $b_{ij}(t)$ and a price $p_{ij}(t)$ in one time slot is analyzed in the present disclosure, and the same analyzing method may be easily used in other time slots. Firstly, a SE for the proposed game is defined as follows.

A price $p_{ij}(t)$ of the seller is predetermined. In a case that $$U_{b_i}(b_{ij}^{SE}(t)) = \sup_{b_{ij}^{min}(t) \leq b_{ij}(t) \leq b_{ij}^{max}(t)} \{U_{b_i}(b_{ij}(t))\},$$

the to-be-offloaded task is determined, and $$U_{s_j}(p_{ij}^{SE}(t)) = \sup_{p_{ij}(t) \geq p_{ij}^c(t)} \{U_{s_j}(p_{ij}(t))\}, b_{ij}^{SE}(t) \text{ and } p_{ij}^{SE}(t)$$

are SE solutions. The optimal solution $(b^*_{ij}(t), p^*_{ij}(t))$ is $(b_{ij}^{SE}(t), p_{ij}^{SE}(t))$ with the following proof.

The problem P2-buyer" is a convex function with respect to $b_{ij}(t)$, a maximum $U_{b_i}(b_{ij}(t))$ is obtained at $b^*_{ij}(t)$, and $b^*_{ij}(t)$ is an SE $b_{ij}^{SE}(t)$.

Based on $$b_{ij}^*(t) = \begin{cases} b_{ij}^L(t), b_{ij}^M(t) \le b_{ij}^L(t) \\ b_{ij}^M(t), b_{ij}^L(t) \le b_{ij}^M(t) \le b_{ij}^U(t), \\ b_{ij}^U(t), b_{ij}^M(t) \ge b_{ij}^U(t) \end{cases} \frac{\partial b_{ij}^*(t)}{\partial p_{ij}(t)} = -\frac{\rho_i}{C^2}\ln 2 < 0$$

may be obtained. $b^*_{ij}(t)$ is a monotonic decreasing function to $p_{ij}(t)$, which indicates that a purchasing intention for computing resources of the buyer decreases with an increase of a price by the seller, resulting in little or no benefit for the seller. Therefore, the seller should set an appropriate price, and an optimal price is obtained by solving $$\frac{\partial U_{sj}(p_{ij}(t))}{\partial p_{ij}(t)} = 0.$$

The optimal offloading task $b^*_{ij}(t)$ decreases with the increase of the price $p_{ij}(t)$ of the seller.

In a case that the optimal offloading task of the buyer/MD is a fixed task, the problem P2-seller' is a convex function to $p_{ij}(t)$, $p^*_{ij}(t))$ is an SE $p_{ij}^{SE}(t)$. A maximum value of the benefit function $U_{sj}(p_{ij}(t))$ is obtained at $p^*_{ij}(t))$.

An offloading pre-screening criterion is provided according to the present disclosure to reduce unnecessary communication signaling overhead and improve the efficiency of task processing. Heterogeneous MDs have different battery energy levels, offloading requirements (queue backlog) and traffic features (such as, task type and computing density). In addition, due to that different MEC servers have different computing resource features (such as, computing resource availability and computing cost) and are located in different locations, different servers requires different prices for computing tasks from different MDs, and thus an MEC server may be not applicable to all the MDs. In order to reduce unnecessary communication signaling overhead, it is important for each of the MDs to select one or more appropriate MEC servers at the beginning of each of the time slots. The offloading selection strategy of the MDs is affected by two main factors: a battery discharge constraint factor (B) and a price factor (P).

For the factor B, limited by a battery discharge constraint $E_i^{min} \le e_{i0}^t(t) \le E_i^{max}$ of each of the MDs, a minimum offloading task in each of the time slots is expressed as:

$$b_{ij}^L(t) = \min\left\{\frac{f_j^{min}\tau}{\gamma_i}, \frac{E_i^{min} - D}{P_i}r_i\right\} \text{ where } D = k_i[f_{i0}^*(t)]^2 - \sum_{\forall x \in N, x \ne j} P_i \frac{b_{ix}^*(t)}{r_i}.$$

A maximum offloading task in each of the time slots is expressed as:

$$b_{ij}^U(t) = \min\left\{Q_i^L(t)\frac{\min\{E_i^{max}, B_i(t) - D\}}{P_i}r_i\right\} \text{ where } Q_i^L(t) = Q_i(t) - b_{i0}(t) - \sum_{\forall x \in N, x \ne j} b_{ix}^*(t).$$

Only in a case that $b_{ij}^L(t) \le b_{ij}^U(t)$, the MD may offload a task to the MEC server j. In a case that $b_{ij}^L(t) > b_{ij}^U(t)$, the MEC server is excluded.

For the factor P, due to that different MEC servers set different prices for resources, each of the MDs selects (or exclude) the servers with more (or less) benefits and determines the size of tasks to be offloaded.

Based on the first-order partial derivative of $U_{b_i}(t)$ with respect to $b_{ij}(t)$, in a case that $$\frac{\partial U_{b_i}(t)}{\partial b_{ij}(t)}\Big|_{b_{ij}(t) = b_{ij}^{min}(t)} > 0, \ p_{ij}(t) < \frac{\rho_i}{(1 + b_{ij}^{min}(t))\ln 2} - \varphi_{ij} + \frac{Q_{ij}(t) + \tilde{B}_i(t)\frac{P_i}{r_i}}{V_i}$$

is obtained, which indicates that in a case that the quotation of the MEC server j meets the above inequality, the MD obtains a maximum benefit $U_{b_i}(t)$ with the increase of $b_{ij}(t)$. That is, for the MD i, in a case that $b_{ij}(t) = b_{ij}^{min}$, the MD may offload the task to the MEC server j only if the quotation of the MEC server j meets the above inequality. If the quotation of the MEC server j does not meet the above inequality, the MEC server j is excluded.

For a buyer, a floating price of the seller is expressed as:

$$p_{ij}^{min}(t) = \psi_j k_j b_{ij}^{min} \frac{\gamma_i^2}{\tau}$$

then, the following inequality is obtained:

$$\psi_j k_j b_{ij}^{min} \frac{\gamma_i^2}{\tau} < \frac{\rho_i}{(1 + b_{ij}^{min})\ln 2} - \varphi_{ij} + \frac{Q_{ij}(t) + \tilde{B}_i(t)\frac{P_i}{r_i}}{V_i} \text{ thus,}$$

$$\frac{Q_i(t) + \tilde{B}_i(t)\frac{P_i}{r_i}}{V_i} > \frac{\rho_i}{(1 + b_{ij}^{min})\ln 2} - \varphi_{ij} - \psi_j k_j b_{ij}^{min} \frac{\gamma_i^2}{\tau},$$

which indicates that the number of available servers is related to the control parameter $V_i$ at the beginning of each of the time slots due to that $Q_{ij}(t)$ and $\tilde{B}_i(t)$ are constant. A smaller $V_i$ indicates more servers are available.

In the implementation of the present disclosure, it is required to quote resources based on feedback information from the buyers, so that when all the sellers reach a SE, all the buyers reach a corresponding SE. In the time slot t, it is assumed that a r-th quotation of the seller j to the purchaser i is represented by $p_{ij}^r(t)$, then after the quotation strategies of all the sellers are determined, an SE solution of a buyer is represented by $b^*_{ij}(t)$. If the buyer reaches the SE solution, the seller adjusts the price strategy based on computing requirements of the buyer. Moreover, an update rate of the price of the purchaser may be expressed as an marginal utility. Therefore, a price iteration process may be expressed as:

$$p_{ij}^{r+1}(t) = p_{ij}^r(t) + v\frac{\partial U_{s_j}(t)}{\partial p_{ij}^r(t)}$$

where v represents a step size in the price iteration process, $$\frac{\partial U_{s_j}(t)}{\partial p_{ij}^r(t)} = b_{ij}^*(t) + p_{ij}^r(t)\frac{\partial b_{ij}(t)}{\partial p_{ij}^r(t)} - 2\psi_j k_j \frac{b_{ij}^*(t)\gamma_i^2}{\tau}\frac{\partial b_{ij}(t)}{\partial p_{ij}^r(t)}.$$

In order to obtain an (r+1)th quotation, it is required for each of the sellers to receive feedback information $b^*_{ij}(t)$ and $$\frac{\partial b_{ij}(t)}{\partial p^r_{ij}(t)}$$

from the buyer.

For each of the buyers, the benefit increases as the quotation increases, that is, $U_{s_j}(t)$ is a convex function with respect to $p_{ij}(t)$. In a case that $$\frac{\partial U_{s_j}(t)}{\partial p_{ij}(t)} = 0,$$

the seller cannot further increase the price. Therefore, under the above constraints, the price of the seller reaches SE. Based on the above analysis, when all the sellers reach SE, all the buyers reach the corresponding SE.

Figure 3:
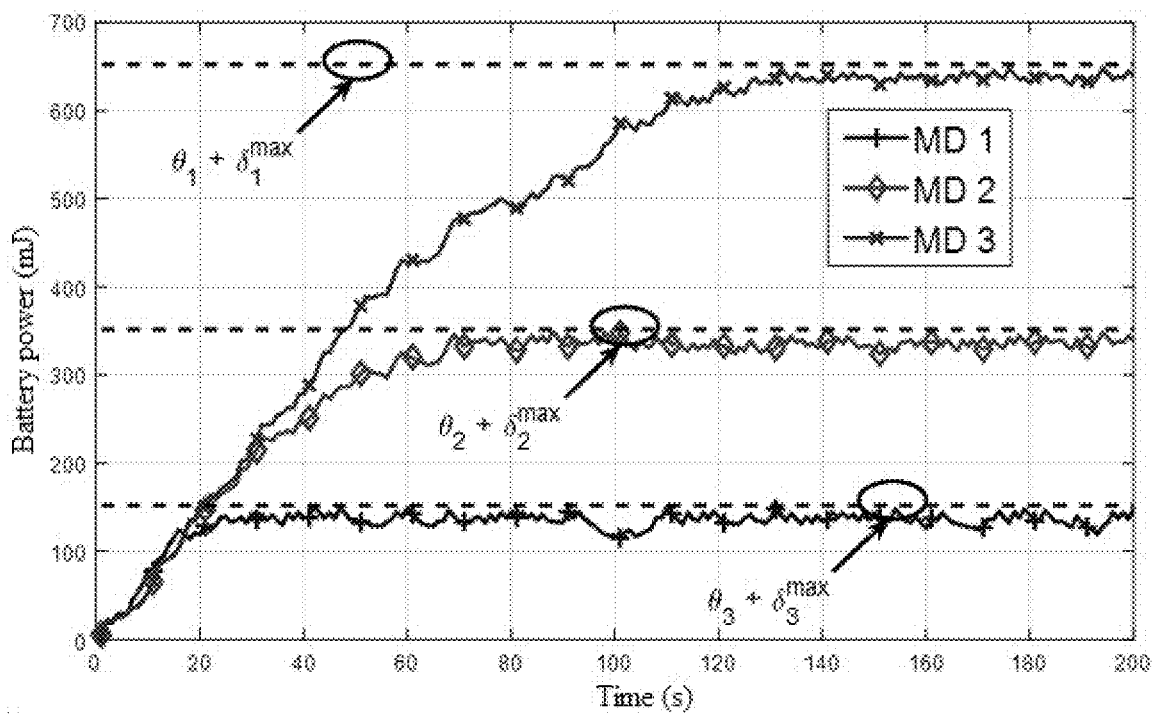
FIG. 3 is a schematic diagram showing changes of an energy level of a battery with time slots.
Figure 4:
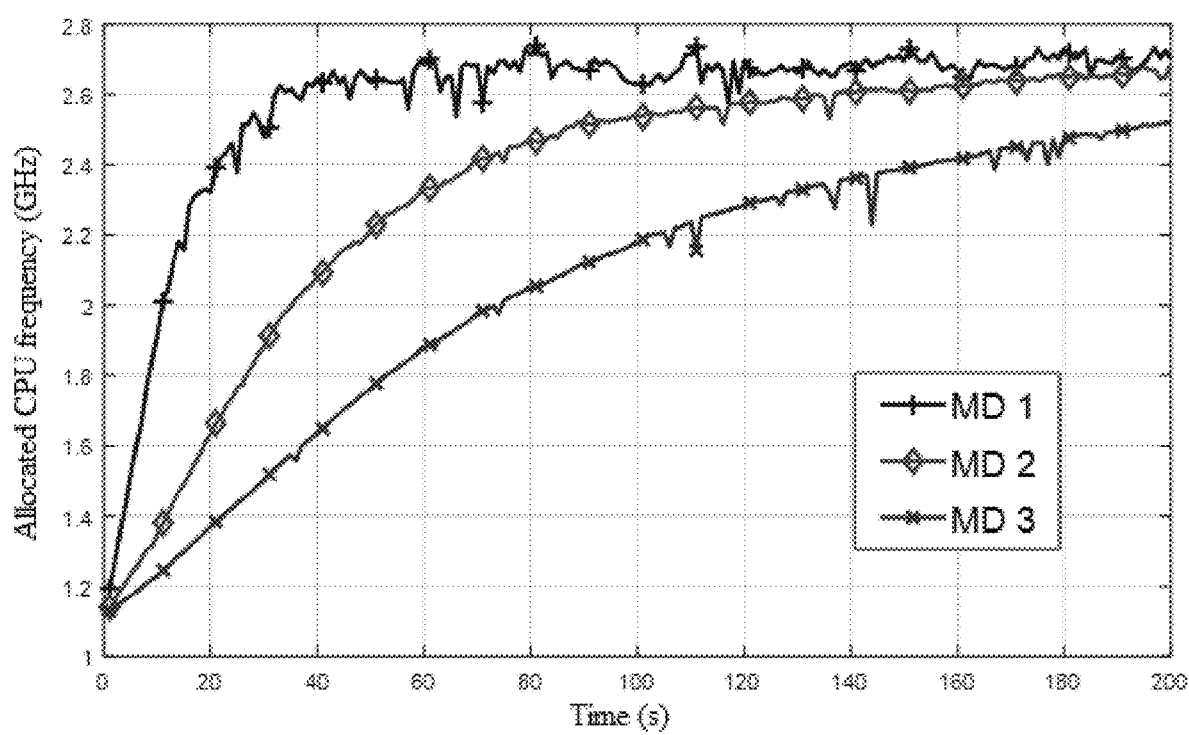
FIG. 4 is a schematic diagram showing changes of on-demand allocation of computing resources with time slots.

Exemplarily, FIG. 3 shows changes of an energy level of a battery with time slots, and FIG. 4 shows changes of an allocated CPU frequency with time slots. The main simulation parameters are set as: three heterogeneous MDs ($V_1$=100, $V_2$=300, and $V_3$=600; $\gamma_1$=1500 $\delta_1$=1000, and $\delta_1$=800), minimum discharge capacity $E_i^{min}$=0.01 mJ, maximum discharge capacity $E_i^{max}$=1 J, a task processing weight factor $\rho_i$=2, a local minimum CPU frequency $f_i^{min}$=0.01 GHz, a local maximum CPU frequency $f_i^{max}$=2 GHz, a minimum CPU frequency of the MEC server is $f_i^{min}$=0.015 GHz, a maximum CPU frequency of the MEC server $f_j^{max}$=4 GHz, a length of a time slot $\tau$=1 s, and a step size for updating price v=5×10$^5$.

In the embodiments of the present disclosure, it can be seen from FIG. 3 that the energy level of the battery reaches stability in the long-term evolution process, which verifies the feasibility of the system. It can be seen from FIG. 4 that, due to different requirements and features of different MDs, different MDs are assigned with different CPU frequency resources, which realizes the on-demand allocation of computing resources while ensuring the maximum system revenue in the MEC environment including heterogeneous users.

Although the embodiments of the present disclosure are shown and described, it should be understood by those skilled in the art that changes, modifications, substitutions and variations may be made to these embodiments without departing from the principle and spirit of the present disclosure. The scope of the present disclosure is limited by the claims and equivalents.

The invention claimed is:

1. A distributed task offloading and computing resources management method based on energy harvesting, comprising:

establishing, based on a mobile edge computing environment, a task local computing model and an edge cloud computing model;

obtaining a benefit obtained by a device purchasing resources from each of mobile edge computing servers for performing task offloading, performing a perturbation Lyapunov optimization algorithm at the device to ensure an energy level of a battery and stability of a task queue at the device, and establishing a device maximum benefit objective function for the device based on the perturbation Lyapunov optimization algorithm;

for each of the mobile edge computing servers, obtaining a benefit of the mobile edge computing server providing a computing service for the device, and establishing a mobile edge computing server maximum benefit objective function;

determining, based on a task backlog of the device, the energy level of the battery of the device and a quotation of each of the mobile edge computing servers, a mobile edge computing server pre-screening criteria, and pre-selecting, by the device based on the pre-screening criteria, a mobile edge computing server for performing task offloading;

calculating, by the device based on a device maximum benefit problem based on the perturbation Lyapunov optimization algorithm, an optimal task size strategy for performing task offloading by the device to the pre-selected mobile edge computing server based on a Lagrange multiplier algorithm and a KKT condition in each of time slots;

for each of the mobile edge computing servers, obtaining, by the mobile edge computing server based on the optimal task size strategy for performing task offloading by the device to the selected mobile edge computing server and a mobile edge computing server maximum benefit problem, an optimal quotation strategy of the mobile edge computing server for the device in each of the time slots; and in a case that the optimal task size strategy for performing task offloading by the device to the pre-selected mobile edge computing server meets a Stackelberg equilibrium and an optimal dynamic quotation strategy of a mobile edge computing server for the device meets the Stackelberg equilibrium, performing, by the device, task offloading to the mobile edge computing server based on an optimal task offloading strategy.

2. The distributed task offloading and computing resources management method based on energy harvesting according to claim 1, wherein the device maximum benefit objective function for the device based on the perturbation Lyapunov optimization algorithm is expressed as:

$$\max_{I_i(t), b_i(t), e_i^h(t)} U_{b_i}(t) = V_i u_{b_i}(t) + Q_i(t)[b_i(t) - a_i(t)] + B_i(t)\left[e_{i0}^l(t) - e_i^h(t)\right]$$

and constraints comprise:

$$0 \le e_i^h(t) \le \delta_i(t)$$

$$E_i^{min} \le e_{10}^l(t) \le \max\{E_i^{max}, B_i(t)\} < \infty$$

$$0 \le \sum_{\forall \hat{j}} b_{i\hat{j}}(t) \le Q_i(t), \forall i \in M, \hat{j} \in \{0, N\}$$

$$f_{\hat{j}}^{min} \le f_{i\hat{j}}(t) \le f_{\hat{j}}^{max}, \forall i \in M, \hat{j} \in \{0, N\}$$

$$\overline{Q}_i = \lim_{T \to \infty} \sup \frac{1}{T} \sum_{t=0}^{T-1} E\{Q_i(t)\} < \infty$$

where $I_i(t) = \{I_{i0}(t), I_{i1}(t), \ldots, I_{in}(t)\}$ representing a set of task offloading strategies of an i-th mobile device; $I_{i0}(t)$ represents a local offloading strategy of the i-th mobile device; $I_{ij}(t)$ represents an offloading strategy of the i-th mobile device performing task offloading to a j-th mobile edge computing server, where j∈{1, 2, . . . , n}; $b_i(t) = \{b_{i0}(t), b_{i1}(t), \ldots, b_{in}(t)\}$ representing a set of processing task size strategies of the i-th mobile device; $b_{i0}(t)$ represents a local processing task size strategy of the i-th mobile device'; $b_{ij}t$) represents a processing task size strategy of the i-th mobile device performing task offloading to the j-th mobile edge computing server; $U_{b_i}(t)$ represents a device maximum benefit objective function of the i-th mobile device based on the perturbation Lyapunov optimization algorithm; $V_i$ represents a non-negative controllable parameter of the i-th mobile device; $u_{b_i}(t)$ represents a maximum benefit function of the i-th mobile device; $Q_i(t)$ represents an task queue backlog of the i-th mobile device in a time slot t;

$$b_i(t) = \sum_{j=0}^{N} b_{ij}(t)$$

representing a sum of tasks processed by the i-th mobile device in the time slot t; $a_i(t)$ represents the size of tasks of the i-th mobile device arrived in the time slot t; $\tilde{B}_i(t)$ represents a virtual energy queue of a battery of the i-th mobile device; $e_{i0}{}^r(t)$ represents total energy consumption of the i-th mobile device in the time slot t; $e_i{}^h(t)$ represents energy charged to the battery of the i-th mobile device in the time slot t; $\delta_i(t)$ represents energy harvested by the i-th mobile device in the time slot t; $E_i^{min}$ represents a minimum battery discharge of the i-th mobile device in each of time slots; $E_i^{max}$ represents a maximum battery discharge of the i-th mobile device in each of the time slots; B (t) represents an energy level of the battery of the i-th mobile device at a beginning of the time slot t; $b_{ij}(t)$ represents the size of task locally processed by the i-th mobile device or offloaded by the i-th mobile device to a ĵ-th mobile edge computing server, where ĵ∈{0,1, . . . , N}; M represents a set of mobile devices; N represents a set of mobile edge computing servers; $f_{\hat{j}}^{min}$ represents a local CPU minimum frequency or a CPU minimum frequency of the ĵ-th mobile edge computing server; $f_{i\hat{j}}(t)$ represents a local CPU frequency or a CPU frequency of the ĵ-th mobile edge computing server allocated for the i-th mobile device; $f_{\hat{j}}^{max}$ represents a maximum local CPU frequency or a maximum CPU frequency of the ĵ-th mobile edge computing server; and T represents an index of a time slot.

3. The distributed task offloading and computing resources management method based on energy harvesting according to claim 2, wherein in the device maximum benefit objective function for the device based on the perturbation Lyapunov optimization algorithm, the i-th mobile device is capable of performing task computing locally only in a case that $f_{i0}{}^L(t) \leq f_{i0}{}^U(t)$, and if the i-th mobile device is capable of performing task computing locally, an optimal local execution strategy is expressed as:

$$f_{i0}^* = \begin{cases} f_{i0}^L(t), & \tilde{B}_i(t) < 0, f_{i0}^M(t) \leq f_{i0}^L(t) \\ f_{i0}^M(t), & f_{i0}^L(t) \leq f_{i0}^M(t) \leq f_{i0}^U(t) \\ f_{i0}^U, & \tilde{B}_i(t) \geq 0 \text{ or } \tilde{B}_i(t) < 0, f_{i0}^M(t) \geq f_{i0}^L(t) \end{cases}$$

where $f^*_{i0}$ represents the optimal local execution strategy;

$$f_{i0}^M(t) = -\frac{A + \sqrt{A^2 - 8\tilde{B}_i(t)k_i\tau\left(Q_i(t) + \frac{V_i\rho_i}{\ln 2}\right)}}{4\tilde{B}_i(t)k_i\tau};$$

$\tilde{B}_i(t)$ represents the virtual energy queue of the battery of the i-th mobile device; $k_i$ represents an effective energy coefficient related to a chip architecture of the i-th mobile device; $\tau$ represents a length of each of the time slots; $V_i$ represents a nonnegative controllable parameter; $Q_i(t)$ represents the task queue backlog of the i-th mobile device in the time slot t; $\rho_i$ represents a benefit weight factor of the i-th mobile device;

$$A = 2\tilde{B}_i(t)k_i\gamma_i + Q_i(t)\frac{\tau}{\gamma_i},$$

where $\gamma_i$ represents a computation density obtained by performing offline measurement.

4. The distributed task offloading and computing resources management method based on energy harvesting according to claim 1, wherein it is determined whether the optimal dynamic quotation strategy of the mobile edge computing server for the device meets the Stackelberg equilibrium, that is, in a case that a quotation of the mobile edge computing server is determined and the following equation holds:

$$U_{b_i}\left(b_{ij}^{SE}(t)\right) = \sup_{b_{ij}^{min}(t) \leq b_{ij}(t) \leq b_{ij}^{max}(t)} \left\{U_{b_i}(b_{ij}(t))\right\}$$

and an offloading task $b_{ij}(t)$ is determined and the following equation holds:

$$U_{s_j}\left(p_{ij}^{SE}(t)\right) = \sup_{p_{ij}(t) \geq p_{ij}^c(t)} \left\{U_{s_j}(p_{ij}(t))\right\}$$

then it is determined that the optimal dynamic quotation strategy of the mobile edge computing server for the device meets the Stackelberg equilibrium;
where $U_{b_i}(b_{ij}^{SE}(t))$ represents a benefit of an i-th mobile device, where $b_{ij}^{SE}(t)$ represents the size of the offloading task; $b_{ij}^{SE}(t)$ represents a Stackelberg equilibrium solution of the size of tasks offloaded from the i-th mobile device to the j-th mobile edge computing server; $b_{ij}^{min}(t)$ represents the minimum size of offloading tasks; $b_{ij}^{max}(t)$ represents the maximum size of offloading tasks; $U_{s_j}(p_{ij}^{SE}(t))$ represents a benefit of a j-th mobile edge computing server, where $p_{ij}^{SE}(t)$ represents a quotation; $p_{ij}^{SE}(t)$ represents a Stackelberg equilibrium solution of the quotation of the j-th mobile edge computing server for the i-th mobile device; and $p_{ij}^c(t)$ represents a cost price of the i-th mobile device performing task offloading to the j-th mobile edge computing server.

5. The distributed task offloading and computing resources management method based on energy harvesting according to claim 4, wherein the cost price $p_{ij}^c(t)$ of the i-th mobile device performing task offloading to the j-th mobile edge computing server is expressed as:

$$p_{ij}^c(t) = \psi_j k_j b_{ij}^*(t) \frac{\gamma_j^2}{\tau}$$

where $\psi_j$ represents unit energy cost of the j-th mobile edge computing server, $k_j$ represents an effective energy coefficient related to a chip architecture of the j-th mobile edge computing server, $b^*_{ij}(t)$ represents the optimal size of tasks offloaded by the i-th mobile device to the j-th mobile edge computing server, $\gamma_i$ represents a computation density obtained by performing offline measurement, and $\tau$ represents a length of each of time slots.

6. The distributed task offloading and computing resources management method based on energy harvesting according to claim 1, wherein the mobile edge computing server maximum benefit objective function is expressed as:

$$\max_{I_j(t), p_j(t), f_j(t)} U_{s_j}(t) = \sum_{i=1}^{m} \left( s_{ji}(t) - \psi_j e_{ji}^p(t) \right)$$

and a constraint is $p_{ji}(t) \geq 0$, $i \in M$, $t \in T$ where $I_j(t) = \{I_{1j}(t), I_{2j}(t), \ldots, I_{mj}(t)\}$ representing a set of task offloading strategy indicators of all mobile devices related to a j-th mobile edge computing server; $p_j(t) = \{p_{1j}(t), p_{2j}(t), \ldots, p_{mj}(t)\}$ representing a set of quotations of the j-th mobile edge computing server for all the mobile devices in a time slot t; $p_{ji}(t)$ represents a quotation of the j-th mobile edge computing server for an i-th mobile device, where $i \in \{1, 2, \ldots, m\}$; $f_j(t) = \{f_{1j}(t), f_{2j}(t), \ldots, f_{mj}(t)\}$ representing a set of CPU frequencies assigned to all the mobile devices by the j-th mobile edge computing server; $f_{ji}(t)$ represents a CPU frequency assigned to the i-th mobile device by the j-th mobile edge computing server; $U_{s_j}(t)$ represents a maximum benefit function of the j-th mobile edge computing server; $s_{ji}(t)$ represents a benefit obtained by the j-th mobile edge computing server processing a task for the i-th mobile device; $\psi_j$ represents unit energy cost of the j-th mobile edge computing server; $e_{ji}^p(t)$ represents energy consumption of the j-th mobile edge computing server processing the task of the i-th mobile device; and m represents the number of mobile devices in a mobile device set.

7. The distributed task offloading and computing resources management method based on energy harvesting according to claim 1, wherein the pre-selecting, by the device based on the pre-screening criteria, a mobile edge computing server for performing task offloading comprises:

in a case that $b_{ij}^L(t) \leq b_{ij}^U(t)$, offloading, by a mobile device, a task to a j-th mobile edge computing server;

in a case that $b_{ij}^L(t) > b_{ij}^U(t)$, excluding a j-th mobile edge computing server; and in a case that $b_{ij}(t) = b_{ij}^{min}(t)$, for an i-th mobile device, if a quotation of the j-th mobile edge computing server meets $$p_{ij}(t) < \frac{\rho_i}{(1 + b_{ij}^{min}(t))\ln 2} - \varphi_{ij} + \frac{Q_{ij}(t) + \tilde{B}_i(t)\frac{P_i}{r_i}}{V_i},$$

offloading, by the mobile device, a task to a j-th mobile edge computing server; and if a quotation of the j-th mobile edge computing server does not meet $$p_{ij}(t) \geq \frac{\rho_i}{(1 + b_{ij}^{min}(t))\ln 2} - \varphi_{ij} + \frac{Q_{ij} + \tilde{B}_i(t)\frac{P_i}{r_i}}{V_i},$$

excluding a j-th mobile edge computing server;

where $b_{ij}^L(t)$ represents the smallest size of offloading tasks in each of time slots; $b_{ij}^U(t)$ represents the maximum size of offloading tasks in each of the time slots; $b_{ij}(t)$ represents the size of tasks offloaded from the i-th mobile device to the j-th mobile edge computing server; $b_{ij}^{min}(t)$ represents the minimum size of tasks offloaded from the i-th mobile device to the j-th mobile edge computing server; $p_{ij}(t)$ represents the quotation of the j-th mobile edge computing server to the i-th mobile device; $\rho_i$ represents a benefit weight factor of the i-th mobile device, $\varphi_{ij}$ represents unit communication cost from the i-th mobile device to the j-th mobile edge computing server in a time slot t; $Q_i(t)$ represents a task queue backlog of the i-th mobile device; $\tilde{B}_i(t)$ represents a virtual energy queue of the battery of the i-th mobile device; $P_i$ represents a transmission power of the i-th mobile device in the time slot t; $r_i$ represents a transmission rate of the i-th mobile device; and $V_i$ represents a non-negative controllable parameter.

8. The distributed task offloading and computing resources management method based on energy harvesting according to claim 1, wherein the device calculates, based on the device maximum benefit problem by using the perturbation Lyapunov optimization algorithm, the optimal task size strategy for performing task offloading by the device to the pre-selected mobile edge computing server based on the Lagrange multiplier algorithm and the KKT condition in each of the time slots, that is, an optimal quotation strategy of a mobile edge computing server for the device in each of the time slots is expressed as:

$$p^*_{ji}(t) = \frac{C^2}{\rho_i \ln 2} b^*_{ij}(t) - 2\psi_j k_j b^*_{ij} \frac{\gamma_i^2}{\tau}$$

where $p^*_{ji}(t)$ represents the optimal quotation strategy of the mobile edge computing server for the device in each of the time slots, $\rho_i$ represents a benefit weight factor of an i-th mobile device, $b^*_{ij}(t)$ represents the optimal size of tasks offloaded by the i-th mobile device to the mobile edge computing server in a time slot t, $\psi_j$ represents unit energy cost of a j-th mobile edge computing server, $k_j$ represents an effective energy coefficient related to a chip architecture of the j-th mobile edge computing server, $\gamma_i$ represents a computation density obtained by performing offline measurement, and $\tau$ represents a length of each of the time slots.

9. The distributed task offloading and computing resources management method based on energy harvesting according to claim 1, wherein the optimal size $b^*_{ij}(t)$ of tasks offloaded by an i-th mobile device to the mobile edge computing server in a time slot t is expressed as:

$$b^*_{ij}(t) = \begin{cases} b_{ij}^L(t), & b_{ij}^M(t) \leq b_{ij}^L(t) \\ b_{ij}^M(t), & b_{ij}^L(t) \leq b_{ij}^M(t) \leq b_{ij}^U(t) \\ b_{ij}^U(t), & b_{ij}^M(t) \geq b_{ij}^U(t) \end{cases}$$

-continued where $b_{ij}^M(t) = \frac{\rho_i}{C} - 1$, $$C = \varphi_{ij}\ln 2 + p_{ij}(t)\ln 2 - \frac{\ln 2}{V_i}\left(Q_i(t) + \tilde{B}_i(t)\frac{P_i}{r_i}\right),$$  (5)

$p_{ij}(t)$ represents a quotation of a j-th mobile edge computing server for the i-th mobile device, $Q_i(t)$ represents a a task queue backlog of the i-th mobile device, $V_i$ represents a non-negative controllable parameter, $\varphi_{ij}$ represents unit communication cost from the i-th mobile device to the j-th mobile edge computing server in the time slot t, $\tilde{B}_i(t)$ represents a virtual energy queue of the battery of the i-th mobile device, $P_i$ represents a transmission power in the time slot t, $r_i$ represents a transmission rate of the i-th mobile device, $b_{ij}^L(t)$ represents the smallest size of offloading tasks with an energy constraint, and $b_{ij}^U(t)$ represents the maximum size of offloading tasks with the energy constraint.

* * * * *